(12) United States Patent
Jacobsen et al.

(10) Patent No.: US 9,758,635 B2
(45) Date of Patent: Sep. 12, 2017

(54) COMPOSITE AND METHODS OF PRODUCTION

(71) Applicant: INEOS NORGE HOLDINGS AS, Stathelle (NO)

(72) Inventors: Harald Jacobsen, Stathelle (NO); Anita Martinsen, Skien (NO)

(73) Assignee: INEOS NORGE HOLDINGS AS, Stathelle (NO)

( * ) Notice: Subject to any disclaimer, the term of this patent is extended or adjusted under 35 U.S.C. 154(b) by 0 days.

(21) Appl. No.: 14/903,307

(22) PCT Filed: Jul. 1, 2014

(86) PCT No.: PCT/EP2014/063998
§ 371 (c)(1),
(2) Date: Jan. 7, 2016

(87) PCT Pub. No.: WO2015/007522
PCT Pub. Date: Jan. 22, 2015

(65) Prior Publication Data
US 2016/0369084 A1 Dec. 22, 2016

(30) Foreign Application Priority Data

Jul. 15, 2013 (EP) .................... 13176509

(51) Int. Cl.
| | |
|---|---|
| *C08J 3/215* | (2006.01) |
| *C08L 27/06* | (2006.01) |
| *C08K 3/36* | (2006.01) |
| *C08J 3/12* | (2006.01) |
| *C08J 3/20* | (2006.01) |
| *C08J 3/205* | (2006.01) |
| *C08J 3/21* | (2006.01) |
| *C08J 5/18* | (2006.01) |
| *C08F 114/06* | (2006.01) |

(52) U.S. Cl.
CPC .............. *C08K 3/36* (2013.01); *C08F 114/06* (2013.01); *C08J 3/122* (2013.01); *C08J 3/203* (2013.01); *C08J 3/205* (2013.01); *C08J 3/212* (2013.01); *C08J 5/18* (2013.01); *C08J 2327/06* (2013.01); *C08K 2201/005* (2013.01); *C08K 2201/011* (2013.01)

(58) Field of Classification Search
None
See application file for complete search history.

(56) References Cited

U.S. PATENT DOCUMENTS

| | | |
|---|---|---|
| 3,391,082 A | 7/1968 | Maclay |
| 4,950,822 A | 8/1990 | Dileo et al. |
| 5,763,388 A | 6/1998 | Lightsey et al. |
| 7,741,403 B2 * | 6/2010 | Geilen ................. C08K 5/0016 524/315 |

FOREIGN PATENT DOCUMENTS

| | | | |
|---|---|---|---|
| DE | 275 376 A3 | 1/1990 | |
| EP | 0 727 466 A1 | 8/1996 | |
| EP | 2 428 531 A1 | 3/2012 | |
| GB | 2267503 A * | 12/1993 | ............. B82Y 30/00 |
| WO | WO 2014/114769 A1 | 7/2014 | |

OTHER PUBLICATIONS

Krug, et al; Nanopartikel; http://www.roempp.com/prod3/roempp.php; publication date Jun. 1, 2011, 3 pages.
"SolVin Paste PVC Handbook"; Jan. 1, 2010; pp. 1, 11, 103, (XP55137416) retrieved from the Internet: URL:http://www.solvyplastics.com/sites/solvayplastics.com/sites/solvayplastics/EN/Solvay%20Plastics%20Literature/BR_Solvin_Paste_PVC_Handbook_EN.pdf [retrieved on Sep. 1, 2014].
Calleja, G., et al; "Where is the glass transition temperature of poly(tetrafluoroethylene)? A new approach by dynamic rheometry and mechanical tests"; *European Polymer Journal*; 49, pp. 2214-2222 (2013).
Kovacs, A.J., et al; "Dynamic Mechanical Properties of Polyvinyl Acetate in Shear in the Glass Transition Temperature Range"; *Dynamic Mechanical Properties of Polyvinyl Acetate in Shear*; vol. 67, pp. 152-161 (1963).

\* cited by examiner

*Primary Examiner* — Vu A Nguyen
(74) *Attorney, Agent, or Firm* — Nixon & Vanderhye P.C.

(57) ABSTRACT

Method of making a composite material by paste polymerization, by forming an emulsion of at least one polymerizable monomer in an aqueous material, polymerizing the emulsion to provide a latex containing particles of polymer, in which the polymer has a glass transition temperature above 65° C., adding nanoparticles to the latex, the nanoparticles having at least one dimension in the range 0.5 to 200 nm, and spray-drying the latex. The at least one polymerizable monomer contains vinyl chloride.

19 Claims, No Drawings

COMPOSITE AND METHODS OF PRODUCTION

This application is the U.S. national phase of International Application No. PCT/EP2014/063998 filed Jul. 1, 2014 which designated the U.S. and claims priority to European Patent Application No. 13176509.1 filed Jul. 15, 2013, the entire contents of each of which are hereby incorporated by reference.

This invention relates to composite materials and methods of their production. More especially the invention relates to the production of composite materials containing nanoparticles and processes for their production.

It is known to prepare composite materials comprising nanoparticles such as carbon nanotubes in a polymer matrix. These materials can have advantageous properties. For example EP1439248 describes a carbon nanotube which is functionalized for example by treatment with strong acid to give a dispersion of functionalized carbon nanotube material dispersed in a polar solvent. The dispersion is then mixed with a solution of a polymer in a solvent. The solvents are removed to give a composite material.

It is also known to prepare PVC polymer nanocomposites from polymers prepared by suspension polymerisation. EP 2428531, for example, describes a method for the production of a PVC polymer nanocomposite by contacting a dispersion of a nanomaterial source with a sorbent PVC polymer. In EP 2428531 the PVC polymers must be sorbent so that they are capable of sorbing the dispersion of the nanomaterial source. Sorbent PVC materials may be prepared by suspension polymerisation of vinyl chloride in a suspending liquid and in the presence of a suspending agent. This produces a slurry (or suspension) of PVC particles, typically of the order of 100 to 200 microns particle size. The resulting slurry of PVC is then dried, usually by centrifuging followed by fluid bed drying, to give a porous (i.e. sorbent) PVC. PVC produced by the suspension method is referred to as "S-PVC". S-PVC can absorb plasticisers to give a dry blend.

PVC can also be produced by what are generally known as paste polymerisation processes. These are so-called because the resin formed, which may also be referred to as paste-PVC, is non-absorbent at ambient temperatures, so that when mixed with a plasticizer a paste (or plastisol) is formed. As well as the difference in porosity of the formed PVC compared to S-PVC, paste processes may also be characterised in that the polymerisation produces a latex of polymer particles of relatively small size compared to the S-PVC process, typically 0.2 to 5 microns. The latex can be spray-dried to produce PVC particles in the form of agglomerates. As well as being non-absorbent at ambient temperatures, the dried PVC polymer particles are compact and also much smaller than the dried particles produced by the suspension PVC processes.

An example of such a process is an emulsion polymerisation process. In such a process an emulsifier is used to produce small droplets of the monomer in a liquid phase. These polymerise to produce relatively small particles of PVC, known as "primary particles", typically of the order of 0.2 to 1 micron particle size, in the form of a latex comprising said particles. The latex is then spray-dried to produce PVC particles in the form of agglomerates, typically with a particle size of up to 63 microns. PVC polymer particles produced by such a process are much smaller than those produced by the suspension PVC processes, are compact and are non-absorbent at ambient temperatures. The PVC formed by emulsion polymerisation is a type of paste-PVC and may be referred to as such, but more specifically is usually referred to as "E-PVC".

Other paste PVC processes include those known as mini-emulsion and micro-suspension, which polymerisations produce latexes of polymer particles typically of the order of about 0.2 to 5 microns particle size. These latexes can also be spray-dried to produce paste PVC particles.

Resin particles produced by paste polymerisation are generally used to make sheets and plastisols. However, since they are non-absorbent the process of EP 2428531 cannot be applied to add nanoparticles and thereby make a composite containing nanoparticles.

U.S. Pat. No. 3,391,082 relates to a method of making xerographic toner compositions by emulsion polymerisation. The compositions comprise a pigment, such as carbon black, and a resin having a glass transition temperature in the range 30-65° C. The resin is formed by emulsion polymerisation of a monomer mixture comprising a "hard" monomer component and a "soft" monomer component, selected to give the required glass transition temperature. Although vinyl chloride is mentioned as an option for the "soft" monomer component, the monomer mixture/glass transition temperature is selected to make the final composite suitable for use as a toner. Further, there is no disclosure that the pigment is added in the form of nanoparticles.

The present invention seeks to provide composite materials containing nanoparticles produced by paste polymerisation processes, as well as sheets and plastisols produced therefrom, having improved physical properties.

According to a first aspect of the invention there is provided a method of making a composite material by paste polymerisation comprising the steps of a) forming an emulsion of at least one polymerisable monomer in an aqueous material b) polymerising the emulsion to provide a latex comprising particles of polymer, wherein said polymer has a glass transition temperature above 65° C., c) adding nanoparticles to the latex said nanoparticles having at least one dimension in the range 0.5 to 200 nm, and d) spray-drying the latex.

The present invention provides a composite material produced by paste polymerisation having improved physical properties.

As used herein, paste polymerisation is a polymerisation which produces a latex comprising particles of polymer, which latex when spray-dried produces PVC which is non-absorbent at ambient temperatures, so that when mixed with a plasticizer a paste (or plastisol) is formed.

As used herein, a "latex" is a dispersion of polymer particles in a liquid, said particles having a volume average particle size as measured by light scattering of from 0.01 to 8 microns, and more preferably from 0.2 to 5 microns.

The paste polymerisation is preferably an emulsion polymerisation where the latex preferably comprises particles of polymer of size from 0.2 to 3 microns, such as particles of polymer of size from 0.2 to 1 micron.

It has surprisingly been found that especially good results can be obtained by adding nanoparticles to the latex of polymer particles. The latex is mixed with the nanoparticles. The nanoparticles are preferably added as a dispersion in a liquid. The liquid phase of the dispersion if present is preferably miscible with the liquid phase of the latex. Either or both liquid phases can contain dispersing or emulsifying agents. The mixture is then dried in a spray drier to give a product which it has been found has unexpectedly good properties. As will be seen from the examples herein the product of the invention has better physical properties than when the nanomaterial is added before polymerisation, when the nanomaterial is added after spray-drying of the latex, or when a different drying method is used.

A single polymerisable monomer may be used, in which case the polymer formed in step (b) is a homopolymer. Alternatively, two or more polymerisable monomers may be used, in which case the polymer formed in step (b) is a copolymer. (As used herein the term "polymer" encompasses both homopolymers and copolymers.)

Preferably the at least one polymerisable monomer comprises vinyl chloride. Vinyl chloride monomer may be the only polymerisable monomer, in which case vinyl chloride homopolymer is formed. Vinyl chloride homopolymer has a glass transition temperature of about 80° C.

Alternatively, the vinyl chloride monomer may optionally be polymerised in the presence of comonomers such as vinyl acetate as long as the produced vinyl chloride copolymer has a glass transition temperature above 65° C. Preferably the glass transition temperature is above 66° C., such as at least 68° C., and most preferably at least 70° C., such as 70-85° C.

As used herein, the glass transition temperature should be measured on the polymer without addition of the nanoparticles. It may be determined by separating and spray-drying a portion of the latex prior to addition of the nanoparticles. The glass transition temperature should be determined by differential thermal analysis according to the method of ISO 11357-2, Plastics-Differential Scanning Calorimetry—Part 2: Determination of glass transition temperature.

The invention is, however, not limited to vinyl chloride composite materials and may be used with other materials which are made by emulsion polymerisation and which have a glass transition temperature above 65° C. By way of non-limiting example, materials which are prepared by emulsion polymerisation include styrene and butadiene to make styrene-butadiene (SBR), butadiene to make polybutadiene, chloroprene to make polychloroprene, acrylonitrile and butadiene to make nitrile rubber, copolymers of hexafluoropropylene (HFP) and vinylidene fluoride (VDF or VF2), terpolymers of tetrafluoroethylene (TFE), vinylidene fluoride (VDF) and hexafluoropropylene (HFP) as well as perfluoromethylvinylether (PMVE) to make fluoroelastomers (FKM), acrylonitrile, butadiene and styrene to make ABS, methyl methacrylate to make PMMA, styrene to make polystyrene, vinylidene fluoride to make polyvinylidene fluoride, vinyl fluoride to make polyvinyl fluoride, tetrafluoroethylene to make polytetrafluoroethylene and vinyl acetate to make polyvinyl acetate. In each case other co-monomers may be present.

As is well known stabilisers and initiators and other materials may be present. The emulsion of step (a) is generally an oil in water emulsion in which droplets of the monomer or monomers are dispersed in an aqueous continuous phase.

The precise nature of the nanoparticles is not of the essence of the invention. The nature of the nanoparticles can be selected depending on the properties which it is intended to enhance. For example silica may enhance scratch resistance and impact strength while silicate clays may enhance stiffness and fire resistance.

The nanoparticles have at least one dimension having a size between 0.5 and 200 nm. As used herein the "nanoparticles having at least one dimension in the range 0.5 to 200 nm" means that 50% or more of the particles in the number size distribution have one or more external dimensions in the size range 0.5 nm-200 nm. Preferably, the nanoparticles have at least one dimension having a size between 5 and 200 nm. In some cases, such as where the nanomaterial is broadly spherical, all three dimensions maybe in this range. In other cases, such as nanotubes, the third dimension may be very much larger. Examples of nanotubes include the various fullerene based carbon or silicon materials such as carbon nanotubes. Other suitable materials where the third dimension may be very much larger include nanofibres such as those of polyolefins, polyamides, polystyrenes, polyesters, polyurethanes, polycarbonates, polyacrylonitrile, polyvinyl alcohol, polymethacrylate, polyethylene oxide, polyvinylchloride, or any blend thereof. Examples of nanoparticles having only one dimension in the range include clays such as montmorillonite. Other suitable nanoparticles include silica, zinc oxide titanium dioxide, calcium carbonate and zinc sulphide. Silica, for example pyrogenic silica and silica made by the sol-gel process is especially preferred.

The nanoparticles are added to the latex. A convenient way of achieving this is by adding the nanoparticles dispersed in a liquid which is miscible with the liquid of the latex. Preferably the nanoparticles can be added as an aqueous dispersion. The precise amount of nanoparticle added to the latex will depend upon the ultimate application of the composite. Typically if less than about 0.1 wt % nanoparticle is added the increase in desirable properties will be too little. Conversely excessive amounts of nanoparticles may adversely affect the bulk properties of the composite. Typically the nanoparticles comprise 0.5-25 wt % such as 0.5-15 wt % for example 1-10 wt % based on the weight of the polymer particles before addition of the nanoparticles.

The mixture can be stirred to achieve good incorporation.

An advantage of the present invention is that no treatment of the nanoparticles or the polymer particles in the latex is required to improve the interaction thereof prior to the spray-drying. However, the nanoparticle dispersion may contain suspending agents or emulsifiers to stabilize the nanoparticle dispersion itself.

Isolation of the solid composite material is achieved by spray drying, for example using a disk or nozzle spray-dryer. The spray-dried particles may have a volume average particle size in the range 0.1 to 100 microns. Especially the spray-dried particles may have a volume average particle size in the range 1-63 microns, and preferably 5-40 microns. The spray-dried particles may have a volume average particle size of greater than 10 microns, such as greater than 15 microns. It has been found that the spray-drying of the particles leads to improved properties compared to other drying methods, such as those involving coagulation.

Typically the resulting particles will be processed for further use, for example by blending with stabilisers, processing agents and/or plasticisers and then subject to further transformation. Thus, for example, if it is desired to make sheets the material can be passed through a roll mill and then pressed. If it is desired to make a plastisol then the material can be blended with a plasticiser and optionally a stabiliser. In a second aspect, the present invention further provides a method of making such a sheet or a plastisol comprising a composite material produced by paste polymerisation.

Accordingly, in a second aspect of the invention there is provided a method of making a sheet or a plastisol comprising a composite material produced by paste polymerisation, said method comprising the steps of a) forming an emulsion of at least one polymerisable monomer in an aqueous material b) polymerising the emulsion to provide a latex comprising particles of polymer, c) adding nanoparticles to the latex, said nanoparticles having at least one dimension in the range 0.5 to 200 nm,
d) spray-drying the latex, and
e) forming the dried composite material into either a sheet or a plastisol.

Preferably the polymer formed in step (b) has a glass transition temperature above 65° C. The preferred glass transition temperature and the other preferred features of this second aspect are as described for the first aspect.

Finally, the invention further provides a composite material obtainable by the above processes, especially in the form of a sheet or a plastisol.

Embodiments of the invention will be described by way of non-limiting example by reference to the following examples and comparative examples.

EXAMPLE 1

Water, vinyl chloride monomer (VCM) and an initiator were charged into a reactor to produce a PVC latex in well-known fashion. Once the reaction has finished the latex is transferred to another vessel and 5% by weight Bindzil® 40/130 added with stirring to give a homogenous dispersion. Percentage by weight was calculated as percentage dry matter in the Bindzil relative to dry PVC in the mixture. Bindzil® is a colloidal nano silica dispersed in an aqueous media and made by AkzoNobel BV. The mixture was then spray dried to give a dry PVC powder.

A portion of the powder was mixed with 5 phr stabiliser and 2 phr processing aid and processed on a two roll mill to produce sheets. The sheets were pressed at 160 C. A further portion of the powder was mixed with 80 phr diisononylisophthalate (DINP) plasticiser and 2.5 phr to produce a plastisol.

Comparative Example 1

The same amount of water, VCM and initiator as set out in Example 1 were charged into a reactor along with 5% by weight Bindzil® 40/130 and the VCM allowed to polymerise under the same conditions as Example 1. When polymerisation was complete the mixture was spray dried in the same manner as in Example 1 to give a dry PVC powder. Sheets and plastisol were prepared in the same way as in Example 1.

Comparative Example 2

The same amount of water. VCM and initiator as set out in Example 1 were charged into a reactor and allowed to react under the same conditions as in Example 1. When polymerisation was complete the mixture was spray dried under the same conditions as Example 1 to give a dry PVC powder. Sheets and plastisol were prepared in the same way as Example 1.

Comparative Example 3

The same amount of water. VCM and initiator as set out in Example 1 were charged into a reactor and allowed to react under the same conditions as in Example 1. Once the reaction has finished the latex is transferred to another vessel and 5% by weight Bindzil® 40/130 added with stirring to give a homogenous dispersion. Percentage by weight was calculated as percentage dry matter in the Bindzil relative to dry PVC in the mixture. The latex was coagulated by freezing and the frozen latex was dried in a vacuum oven until a dry powder was formed. Sheets were prepared in the same way as Example 1.

The physical properties of the sheets were measured and the results are shown in Table 1:

TABLE 1

| | Example 1 | Comparative Example 1 | Comparative Example 2 | Comparative Example 3. |
|---|---|---|---|---|
| Charpy Impact (ISO179) kJ/m2 | 18.9 | 9.96 | 7.65 | 13.90 |
| Standard Deviation | 0.88 | 1.36 | 0.68 | 1.47 |
| Tensile strength (MPa) | 51.4 | 52.8 | 57.4 | 52.3 |
| Standard Deviation | 0.47 | 0.47 | 0.45 | 0.68 |
| Elastic Modulus (MPa) | 2933 | 3033 | 3150 | 3052 |
| Standard Deviation | 88 | 89 | 201 | 46 |

It will be apparent that the Charpy Impact strength of the composition of the invention is very significantly greater than either similar material where the nanoparticles are present when the VCM monomer is polymerised (Comparative Example 1) and when nanoparticles are not present (Comparative Example 2). Further, it will be apparent that the Charpy Impact strength of the composition of the invention is significantly greater than similar material where the latex is not dried by spray-drying but by coagulation (Comparative Example 3). The tensile strength and elastic modulus remain broadly unchanged.

The viscosity of the plastisol was measured with a Brookfield™ viscometer after 2 h and the results are shown in Table 2.

TABLE 2

| | Example 1 | Comparative Example 1 | Comparative Example 2 |
|---|---|---|---|
| Brookfield 2.5 rpm | 336 | 728 | 197 |
| Brookfield 20 rpm | 64.2 | >100 | 42.8 |
| Brookfield 100 rpm | 19.5 | >50 | 14.9 |

It will be apparent from Table 2 that the plastisol of the invention has reduced viscosity compared with a nanoparticle containing material made in another way.

EXAMPLE 3

A latex was made as described in Example 1. Elkem NanoSilica® 999 (available from Elkem AS) was dispersed in water to give a 50 wt % dispersion. This dispersion was added to the latex to give 10 wt % silica content in the mixture. Percentage by weight was calculated as percentage dry matter in the Nanosilica® 999 dispersion relative to dry PVC in the mixture.

The mixture was then spray dried to give dry PVC particles in the same manners as described in connection with example 1. A portion of the powder was formed into a sheet as described in Example 1.

Comparative Example 4

Dry PVC particles of Comparative Example 2 were blended with 10 phr Elkem Nanosilica® 999 5 phr stabiliser and 2 phr stabiliser and formed into sheets as described by reference to Example 1.

The Charpy Impact Strength of the materials was measured and is shown in Table 3

TABLE 3

|  | Example 3 | Comparative Example 2 | Comparative Example 4 |
|---|---|---|---|
| Charpy Impact Strength (ISO 179) | 19.7 | 7.65 | 18.15 |
| Standard Deviation | 0.72 | 0.68 | 0.84 |

It will be seen that the impact strength of the product of the invention is significantly (greater than 2 sigma) stronger than material in which nanoparticles had been introduced after latex drying and very significantly stronger than material which contains no nanoparticles.

The invention claimed is:

1. A method of making a composite material by paste polymerisation comprising the steps of:
   a) forming an emulsion of at least one polymerisable monomer in an aqueous material,
   b) polymerising the emulsion to provide a latex comprising particles of polymer, wherein said polymer has a glass transition temperature above 65° C., and further wherein said particles have a volume average particle size as measured by light scattering of from 0.2 to 5 microns,
   c) adding nanoparticles to the latex, said nanoparticles having at least one dimension in the range 0.5 to 200 nm, wherein the nanoparticles are added in an amount of 0.5-25 wt % based on the weight of the polymer particles before addition of the nanoparticles, and
   d) spray-drying the latex,
   wherein the at least one polymerisable monomer comprises vinyl chloride.

2. A method as claimed in claim 1 comprising, after step (d), a further step (e) of forming the dried composite material into either a sheet or plastisol.

3. A method as claimed in claim 2 wherein the glass transition temperature is above 66° C.

4. A method as claimed in claim 1 wherein the glass transition temperature is above 66° C.

5. A method as claimed in claim 1 wherein the polymer formed in step (b) is a PVC homopolymer.

6. A method as claimed in claim 1 wherein the nanoparticles are added as an aqueous dispersion.

7. A method as claimed in claim 1 wherein the nanoparticles comprise silica.

8. A method as claimed in claim 1 wherein the spray-dried particles of the composite material have an average particle size in the range 10-63 microns.

9. A method as claimed in claim 2 wherein the polymer formed in step (b) is a homopolymer.

10. A method as claimed in claim 2 wherein the nanoparticles are added as an aqueous dispersion.

11. A method as claimed in claim 2 wherein the nanoparticles comprise silica.

12. A method as claimed in claim 2 wherein the spray-dried particles of the composite material have an average particle size in the range 10-63 microns.

13. A method as claimed in claim 3 wherein the glass transition temperature is at least 68° C.

14. A method as claimed in claim 13 wherein the glass transition temperature is at least 70° C.

15. A method as claimed in claim 4 wherein the glass transition temperature is at least 68° C.

16. A method as claimed in claim 15 wherein the glass transition temperature is at least 70° C.

17. A method as claimed in claim 16 wherein the glass transition temperature is at least 70-85° C.

18. A method as claimed in claim 8 wherein the spray-dried particles of the composite material have an average particle size in the range 15-40 microns.

19. A method as claimed in claim 12 wherein the spray-dried particles of the composite material have an average particle size in the range 15-40 microns.

* * * * *